United States Patent
Capko et al.

(10) Patent No.: US 10,012,257 B2
(45) Date of Patent: Jul. 3, 2018

(54) COMPONENT ARRANGEMENT WITH A BLIND RIVET NUT

(71) Applicant: BENTELER AUTOMOBILTECHNIK GMBH, Paderborn (DE)

(72) Inventors: Peter Capko, Ismaning (DE); Enrico Seidl, Neukirchen (DE)

(73) Assignee: Benteler Automobiltechnik GmbH (DE)

( * ) Notice: Subject to any disclaimer, the term of this patent is extended or adjusted under 35 U.S.C. 154(b) by 96 days.

(21) Appl. No.: 14/790,625

(22) Filed: Jul. 2, 2015

(65) Prior Publication Data

US 2016/0003286 A1    Jan. 7, 2016

(30) Foreign Application Priority Data

Jul. 4, 2014    (DE) .................. 10 2014 109 361

(51) Int. Cl.
*F16B 37/06*    (2006.01)
*F16B 33/00*    (2006.01)
*F16B 5/02*    (2006.01)

(52) U.S. Cl.
CPC .......... *F16B 37/067* (2013.01); *F16B 33/008* (2013.01); *F16B 5/0225* (2013.01)

(58) Field of Classification Search
CPC ....... F16B 5/0225; F16B 5/025; F16B 37/067
USPC .................................. 411/34, 183
See application file for complete search history.

(56) References Cited

U.S. PATENT DOCUMENTS

| | | | | |
|---|---|---|---|---|
| 1,872,385 | A * | 8/1932 | Andren | B21D 39/03 192/36 |
| 3,686,914 | A * | 8/1972 | Powsey | F16B 37/067 411/34 |
| 3,948,142 | A * | 4/1976 | McKay | F16B 37/067 411/38 |
| 4,007,659 | A * | 2/1977 | Stencel | F16B 19/1054 411/34 |
| 5,540,528 | A * | 7/1996 | Schmidt | F16B 19/1081 24/297 |

(Continued)

FOREIGN PATENT DOCUMENTS

CH           610 057 A      3/1979
DE        33 31 880 A1      6/1984

(Continued)

*Primary Examiner* — Fleming Saether
(74) *Attorney, Agent, or Firm* — Sheridan Ross P.C.

(57) ABSTRACT

A component arrangement comprising a first component, a second component, at least one screw means and at least one blind rivet nut for insertion into a wall of the first component and for coupling to at least one second component is provided. The blind rivet nut has a rivet head, and the sum of a diameter of the rivet head and twice a spacing between the second component and rivet head corresponds to 0.7 to 1.2 times a diameter of a bead-like protuberance of the blind rivet nut, the second component, in the coupling region, being in contact with the first component only in sections, the second component having a spacing from a rivet head of the blind rivet nut within a plane which is parallel to a contact surface between rivet head and first component. The spacing is greater than a wall thickness of the first component.

15 Claims, 5 Drawing Sheets

(56) References Cited

U.S. PATENT DOCUMENTS

| | | | | |
|---|---|---|---|---|
| 6,826,820 | B2* | 12/2004 | Denham | F16B 37/067 29/524.1 |
| 6,893,196 | B2* | 5/2005 | Wille | F16B 19/1072 411/183 |
| 9,051,958 | B2* | 6/2015 | Grojean | F16B 37/067 |
| 2004/0056167 | A1* | 3/2004 | Vogt | A47G 1/164 248/475.1 |

FOREIGN PATENT DOCUMENTS

| | | |
|---|---|---|
| DE | 697 11 285 T2 | 11/2002 |
| DE | 60 2004 000 246 T2 | 9/2006 |
| DE | 10 2007 060 089 A1 | 6/2009 |
| DE | 10 2011 014 656 A1 | 9/2012 |

* cited by examiner

COMPONENT ARRANGEMENT WITH A BLIND RIVET NUT

CROSS-REFERENCE TO RELATED APPLICATIONS

This application claims the benefit of German Patent Application No. DE 10 2014 109 361.5, filed Jul. 4, 2014, the entire contents of which are incorporated herein by reference.

FIELD

The invention relates to a component arrangement having a blind rivet nut for the coupling of a first component composed of an aluminum alloy to at least one second component, and to the use of a blind rivet nut in a component arrangement.

BACKGROUND

In the field of connecting technology, a multiplicity of connecting means exists, which are also referred to as joining aids. These include inter alia blind rivets, wherein a special form of said connecting means is so-called blind rivet nuts, also referred to as threaded hollow rivets.

Such connecting means are well known in the prior art.

Blind rivet nuts are distinguished in general by the fact that they are passed through or inserted into a prefabricated hole and subsequently the first component is placed in contact with the second component, wherein subsequently, the second component is fixed thereto by way of the blind rivet nut with the aid of a screw means. The engagement of the screw into the blind rivet causes the latter to deform in a thread-free length section such that a bead-like protuberance is formed in the direction of the second component, which bead-like protuberance generates a non-positively locking and positively locking connection between the first component and the second component. The bead-like protuberance secures the blind rivet so as to be prevented from being torn out when the screw means is used. It is particularly advantageous that the blind rivet nut can realize such a connection of components even if there is only access available from one side for the installation process, for example in the case of the fastening of a sheet-metal component or flange component to a hollow profile.

To realize adequate connection strengths, it has proven expedient in the case of blind rivet nuts to use screw means such as screws or threaded bolts composed of steel, owing to the high maximum possible tightening forces and low costs.

However, in combination with components composed of aluminum, in particular from the group of 7000 grade aluminum alloys, there is the problem that the blind rivet nuts composed of steel react in intensely corrosive fashion with said component.

From the prior art, for example DE 60 2004 000 246 T2 or DE 697 11 285 T2, a person skilled in the art is now also familiar with blind rivet nuts composed of an aluminum alloy or a copper alloy. Said blind rivet nuts are however nowadays used only for the connection of aluminum components or other component arrangements which do not have a corrosive action on one another, or said blind rivet nuts must be subjected to special surface treatment.

Furthermore, DE 10 2011 014 656 A1 has disclosed a component arrangement having a blind rivet unit produced from two individual parts, with a setting part situated in front in the driving-in direction and with a deformation part situated behind. The aim, with positively locking fastening on both sides, is an optimization of the setting process and a high level of adaptation of the deformation behavior of the blind rivet unit in the two deformation regions of setting part and separate deformation part. A disadvantage is the increased outlay for the positioning of the individual parts with respect to one another.

CH 610 057 A presents possibilities for tolerance compensation, for example by means of a horizontally running slot and a vertically running slot in a base plate for the purposes of component positioning, alignment and installation for a suspension device.

DE 10 2007 060 089 A1 has disclosed a component arrangement having blind rivet nuts, wherein there is a small spacing between rivet head and second component by virtue of a hole in the second component being of larger area than the hole in the first component. The blind rivet is, in the installed state, provided with a small bead which corresponds approximately to the area of the hole in the second component. The bead is formed not by the entire deformed wall of a length section of the blind rivet but only by a small external wall part owing to the axial incision in said section. This however results in a deficient counterbearing function. Therefore, the flange-like rivet head must protrude a great distance beyond the first component such that, when the screw is tightened by way of a tool during the installation of the second component, the blind rivet is adequately supported on the tool and the blind rivet is not pulled out of the first component.

SUMMARY

Embodiments of the present disclosure provide a component arrangement or connection which is adequately resistant to corrosion. In addition, embodiments of the present disclosure expand the limits of use of a blind rivet nut composed of an aluminum alloy through design optimization, and to propose a novel use which makes it possible, with a blind rivet nut of said type, to satisfy additional requirements and/or integrate further functions.

The invention proposes a component arrangement comprising a first component, a second component, at least one screw means and at least one blind rivet nut, composed of an aluminum alloy, for insertion into a wall region of the first component and for coupling, by screw action, to at least one second component, wherein the first component is composed of an aluminum alloy, in particular of an aluminum alloy from the 7000 group as defined in DIN EN 573-3, at least in the coupling region to the second component, and wherein a screw means for the coupling is composed of a material which has a contact-corrosive action on the first component.

By means of this arrangement, it is possible for said type of connecting technology to be made usable for mixed constructions composed of different metallic materials, without the need for additional coatings or other isolating or galvanic separation methods of surface treatment.

At the same time, by means of the blind rivet nuts composed of an aluminum material, it is achieved that highly precise and intense deformation is made possible in the thread-free length section in the state of use, with permanently stable coupling being generated. The screw means is advantageously formed from a steel alloy for reasons of low costs and greater tightening strength.

It is preferably the case that the second component, in particular in the coupling region, is in contact with the first component only in sections, the rivet head having either a width and a length, that is to say being angular, or a diameter, that is to say being circular, wherein the second component has a spacing to the rivet head within a plane which is parallel to the contact surface between rivet head and first component. If a screw connection is now realized such that the second component has a spacing within a plane which is parallel to the contact surface between rivet head and first component, there is the problem in the case of blind rivet nuts according to prior art that, when the screw means is tightened, the blind rivet is torn out of the first component, or the support on the component is not fully ensured owing to said spacing. Normally, compensation must be realized by way of additional shim means, which has proven difficult to automate owing to the handling effort involved, and which is virtually ruled out in the case of the first component being designed as a hollow profile. Therefore, it is often necessary for the wall thickness to be correspondingly increased such that the blind rivet nut is prevented from being pulled out when the screwing-in torque of the screw means is applied. This can be prevented more efficiently by way of the arrangement and use of the blind rivet nut according to the invention.

It may particularly advantageously be provided that, in the component arrangement, the sum of the width of the rivet head and twice the spacing between second component and rivet head, measured in a direction parallel to the spatial axis X, corresponds to 0.7 to 1.2 times, preferably 0.8 to 1 times, the bead diameter. Alternatively, in the case of circular blind rivet nuts, it is provided that the sum of the diameter of the rivet head and twice the spacing between second component and rivet head, measured in a direction parallel to the spatial axis X, corresponds to 0.7 to 1.2 times, preferably 0.8 to 1 times, the bead diameter.

Owing to a tolerance compensation function between first component, second component and possibly further components, it may also be the case that the spacing between a blind rivet nut and the second component in the head width direction of the head length direction, measured from both sides of the rivet head, is not constant. This variant is discussed in more detail in the description of the figures with regard to FIG. 6. In this case in the context of the invention, it is the case that, instead of two times the spacing between second component and rivet head measured in the direction parallel to the spatial axis X or in the direction parallel to the spatial axis Z, the sum of the two mutually different spacings in the direction parallel to the spatial axis X or the sum of the two mutually different spacings in the direction parallel to the spatial axis Z is taken into consideration. Here, it is the case that the sum of the width of the rivet head and two mutually different spacings between second component and rivet head, measured in a direction parallel to the spatial axis X, corresponds to 0.9 to 1.1 times the bead diameter, or that the sum of the diameter of the rivet head and two mutually different spacings between second component and rivet head, measured in a direction parallel to the spatial axis Z, corresponds to 0.7 to 1.2 times, preferably 0.8 to 1 times, the bead diameter.

It is preferably the case that, in the component arrangement according to the invention, the blind rivet nut has, at least in sections in a thread-free length section, a bead-like protuberance with an enlarged bead diameter, wherein the bead diameter is larger than the spacing between rivet head and second component within a plane parallel to the contact surface between rivet head and first component. In this way, it is achieved that the rivet head is much better secured against being pulled out of the first component, in particular in the case of a correspondingly enlarged spacing between second component and rivet head. The bead-like protuberance reliably realizes an additional support surface which, in addition to the wall thickness of the first component itself, ensures that the rivet head is not pulled out of the first component, and over the service life of the component connection, greater load-bearing capacity of the connection with regard to bending and torsional loads is realized.

Such a spacing between rivet head and second component within a plane parallel to the contact surface between rivet head and first component can be realized for example by virtue of a tolerance compensation opening being formed in the second component in the coupling region at least in a spatial direction within a plane parallel to the contact surface between rivet head and first component. A tolerance compensation opening is required in particular when components of relatively large geometric extent are to be connected in order to permit position orientation relative to a defined point, as is necessary for example in the case of automobile body construction, in order to compensate production tolerances during the coupling. A tolerance compensation opening of said type may in this case be realized within a spatial plane along a spatial axis, or else along two mutually perpendicular spatial axes of the spatial plane. In particular in the latter variant, it is crucial that the bead-like protuberance is realized reliably and uniformly so as to form an enlarged bead diameter, such that an adequately large support surface is formed. Here, a bead diameter is to be understood to mean the maximum diameter generated as measured from the outer circumference of the blind rivet nut in the thread-free length section, that is to say between rivet head and length section with thread.

In the latter variant, in the two mutually perpendicular spatial axes, there are spacings between rivet head and second component such that positioning of the second component relative to the first component is possible with a high level of flexibility. There may be either two identical spacings in each spatial axis, or there is a maximum spacing on one side of the rivet head, while a spacing diametrically on the other side of the rivet head, opposite said maximum spacing, tends to zero. Alternatively, there may however also be two spacings of different size. In the context of the invention, in the latter two variants, where claim 1 refers to "twice a spacing", the sum of the two different spacings within a spatial axis should be used accordingly.

In a refinement of the invention, the spacing, measured axially parallel to the head width direction, amounts at least to half of the width of at least half of the diameter of the rivet head. Alternatively, it is possible for the spacing, measured axially parallel to the head length direction, to correspond at least to half of the length of the rivet head.

In turn, it may alternatively be provided that the spacing, measured axially parallel to the head width direction, corresponds at least to half of the width of the rivet head, and measured axially parallel to the head length direction, at the same time corresponds to at least half of the length of the rivet head. In the case of such an invention, the risk of the blind rivet nut being torn out when the screw means is used is particularly great, or it is at least the case that a permanent connection of the service life of the first and second components is not ensured.

The component arrangement preferably comprises at least two blind rivet nuts, the second component, in the coupling region to the blind rivet nuts, having in each case one opening for the leadthrough of the screw means, wherein the openings permit tolerance compensation in two mutually perpendicular spatial axes within a plane which is parallel to the contact surface between rivet head and first component.

The component arrangement preferably has a blind rivet nut whose rivet head has a head height and protrudes beyond the surface of the first component by approximately ⅓ of the head height with a protruding length.

In a refinement of the invention, the blind rivet nut in the component arrangement terminates substantially flush with the surface of the first component at least in the coupling region. The blind rivet nut preferably has a head height which corresponds to at least ⅓ of the wall thickness of the first component in the coupling region. It is thus achieved that the second component can be fed and supplied and coupled to the first component in the coupling region in a particularly reliable and precise manner, without tilting or other inaccuracies occurring during the positioning process. Likewise, it is thus possible to reliably eliminate undefined gaps which could for example give rise to subsequent onset of corrosion.

Furthermore, it is however preferably also possible for the blind rivet to have a head height which corresponds to between ¼ of and 1.5 times the wall thickness of the first component in the coupling region, and by virtue of the fact that it is pressed only partially into the wall, protrudes beyond the surface of said wall. A protruding length between the surface of the first component and the rivet head particular preferably amounts to at most approximately ⅓ of the head height.

In the case of such use, it is possible to realize a targeted joint gap which is formed between the first component and the second component at least in the coupling region, wherein the gap can be utilized for example for an additional cohesive connection, for example by way of an adhesive bonding process. It is however also possible for the gap thus formed to serve for tolerance compensation between the first component and the second component in a direction perpendicular to the spatial plane parallel to the rivet head. Furthermore, the protruding rivet head may be formed if it is necessary for the rivet head itself to impart increased support with regard to the torque of the screw means.

A further aspect of the invention relates to the use of a blind rivet nuts composed of an aluminum alloy, in particular of an aluminum alloy from the 5000 group as defined by DIN 573-3, in a component arrangement as described above.

In a first variant, the blind rivet nut comprises a circular cross section with an outer diameter and with an internal thread with a thread diameter, and comprises a thread-free length section with an internal diameter, and comprises a rivet head with a head height in particular between 0.1 and 3 mm, preferably 0.3 to 1.5 mm. It is important here that the ratio of outer diameter and internal thread diameter amounts to between 1.3 and 2.5, preferably between 1.5 and 2.1. The special characteristic yielded by such a refinement of the geometric relationships of the blind rivet nut is a precise bead-like protuberance during use.

A further variant of the use according to the invention provides a blind rivet nut which is composed of an aluminum alloy, in particular of an aluminum alloy from the 5000 group as defined by DIN 573-3, and which is provided with a polygonal cross section. Furthermore, the blind rivet nut has a first length section with an outer circumference, and an internal thread with a thread diameter, and a thread-free length section with an inner diameter, and a rivet head. In this case, the ratio of inner diameter to internal thread diameter amounts to between 2.5 and 1.5. In this case, too, said geometry serves for realizing a precise bead-like protuberance in the thread-free length section of the blind rivet nut. In this way, in particular, additional support is realized by way of the blind rivet nut itself, as a greater spacing is realized between rivet head and second component in a spatial plane parallel to the rivet head. The height of the rivet head is preferably between 0.1 and 3 mm, preferably 0.3 to 1.5 mm.

Where expedient, the same reference signs have been used for identical or similar functions or regions.

DETAILED DESCRIPTION

Figure 1:
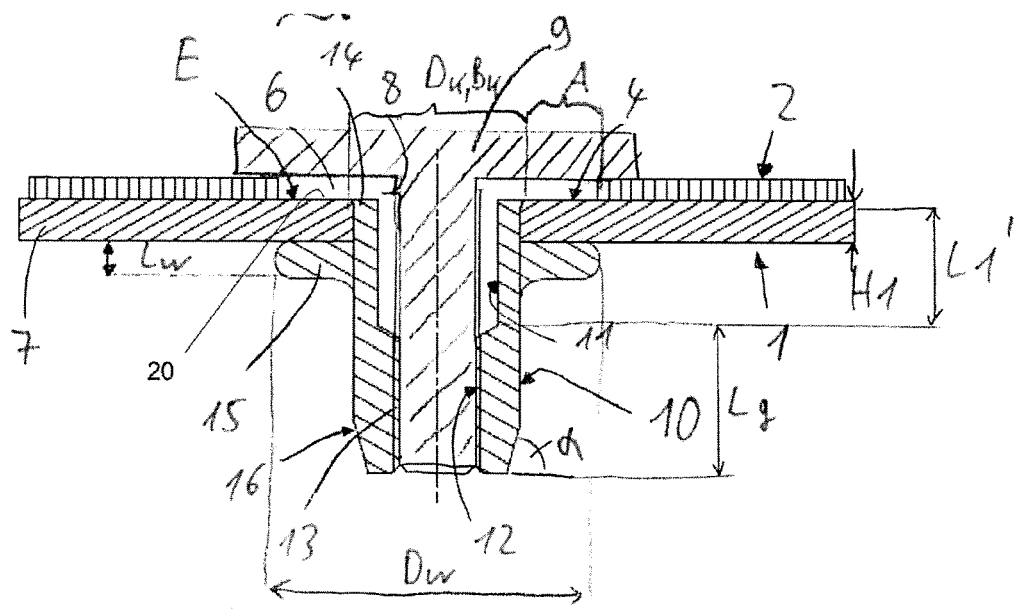
FIG. 1 shows a first design variant of the component arrangement according to the invention.
Figure 4:
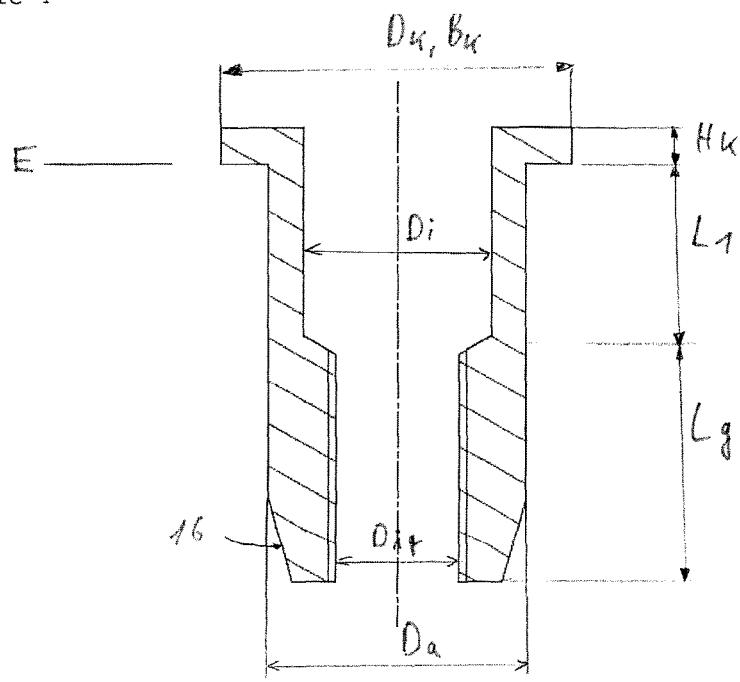
FIG. 4 shows a first design variant of a blind rivet nut for a component arrangement according to the invention.
Figure 5:
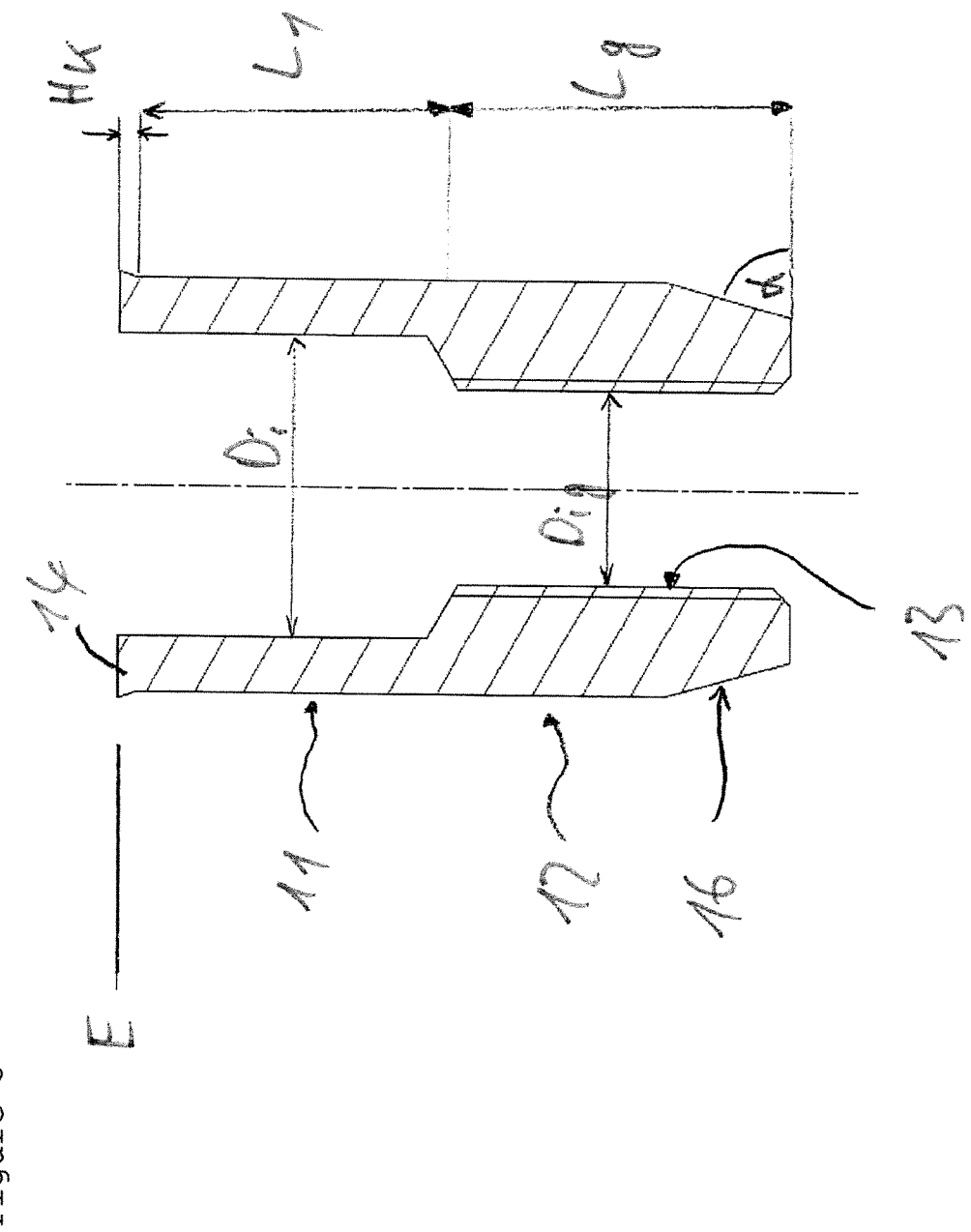
FIG. 5 shows a second design variant of a blind rivet nut for a component arrangement according to the invention.

FIG. 1 shows, in a cross-sectional view, a first design variant of the component arrangement according to the invention in a coupling region 6 in which a first component 1 is coupled to a second component 2. The first component 1, with a wall thickness H1, is extended through by the blind rivet nut 10 such that the head 14 of the blind rivet nut 10 terminates flush with the surface 4 of the first component in the coupling region 6. The blind rivet 10 extends through the wall thickness H1 of the first component. The blind rivet 10 has, adjacent to its rivet head 14, a thread-free length section 11 whose original length L1 is illustrated in FIGS. 4 and 5 has been compressed in this installed state to a length L1', and a second length section 12 with thread 13 of length Lg, wherein a bead-like protuberance 15 with a diameter Dw and a bead thickness Lw is formed in the region of the thread-free length section 11. The protuberance is formed in the component arrangement owing to the tightening torque imparted by the indicated screw means 9, such that the thread-free length section 11 is also compacted or shortened. The sum of the width Bk of the rivet head 14 and twice the spacing A between second component 2 and rivet head 14 is in this case equal to the bead diameter Dw.

The second component 2 lies on the surface 4 of the first component 1, said second component being arranged with a spacing A to the rivet head 14 in a plane E which is parallel to the contact surface between rivet head 14 and first component 1. It can be seen in this design variant that the spacing A corresponds approximately to twice the wall thickness H1 of the first component, as is realized here by way of a particularly large opening 8 in the second component for the purposes of tolerance compensation of the two components with respect to one another. On an end of the blind rivet nut 10 averted from the rivet head 14, there is formed a chamfer which serves for easier insertion and which has an angle α between the face side 16 or the longitudinal flank of the outer circumference of said end and the spatial plane E which is parallel to the rivet head.

Figure 2:
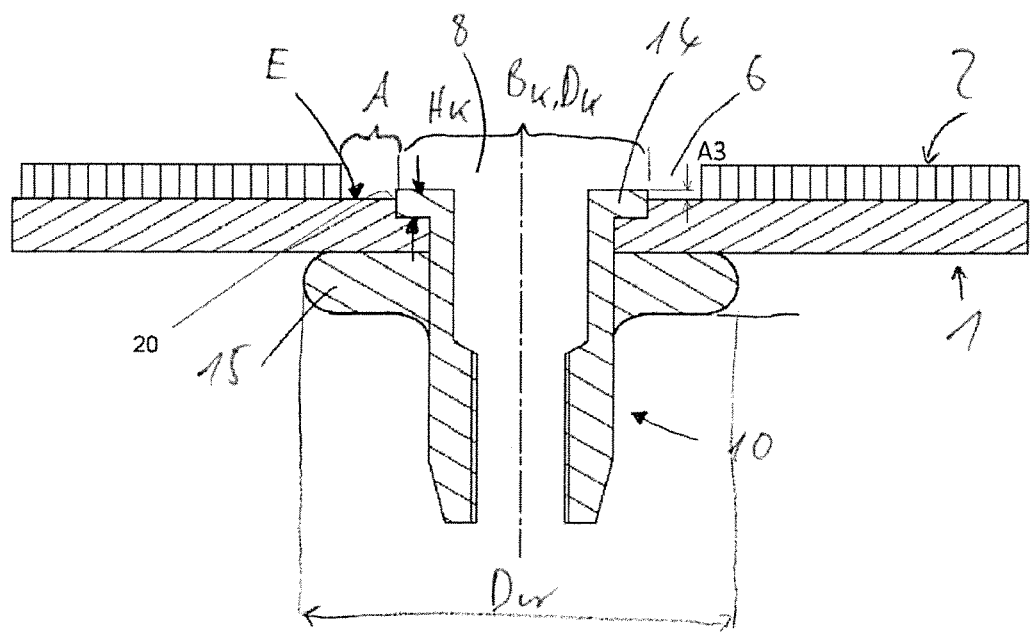
FIG. 2 shows a second design variant of the component arrangement according to the invention.

FIG. 2 illustrates a second design variant of the component arrangement according to the invention and of a blind rivet nut 10 according to the invention, wherein differences with respect to the first design variant exist in that, firstly, the spacing A between rivet head 14 and second component 2 within a plane E parallel to the contact surface between rivet head 14 and first component 1 corresponds approximately to the wall thickness H1 of the first component 1. The sum of the width Bk of the rivet head 14 and twice the spacing A between second component 2 and rivet head 14 corresponds in this case approximately to 0.9 times the bead diameter Dw.

Secondly, this design variant differs from the first design variant in that the rivet head 14 has a greater head height Hk and protrudes by approximately ⅓ of its head height Hk, with the protruding length A3, beyond the surface 4 of the first component 1.

On that end of the blind rivet nut 10 which is averted from the rivet head 14, there is formed a chamfer which serves for easier insertion and which has an angle α between the face side 16 of said end and the spatial plane E which is parallel to the rivet head 14.

Figure 3:
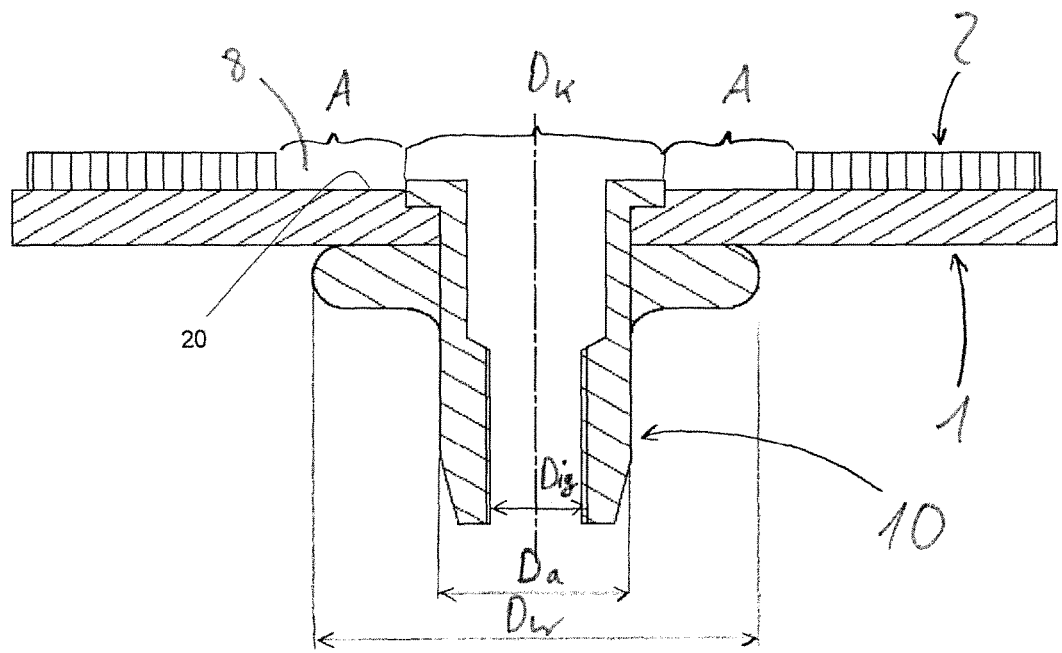
FIG. 3 shows a third design variant of the component arrangement according to the invention.

By contrast, FIG. 3 shows a third variant with a spacing between the rivet head 14 and the second component 2 within a plane E which is parallel to the contact surface between rivet head 14 and first component 1, wherein firstly, the spacing A is greater than the wall thickness H1 of the first component 1. Secondly however, the sum of twice the spacing A and head width Bk or head diameter Dk corresponds approximately to 1.2 times the bead diameter Dw.

Furthermore, all three design variants have in common the fact that the first component is formed as an aluminum component, in particular from an aluminum alloy from the 7xxx group as defined by DIN EN 573-3, and the blind rivet nut 10 itself is composed of an aluminum alloy. The screw means 9 for the use of the blind rivet nut 10 according to the invention is advantageously composed of a steel material, which permits the use of high tightening torques such as are required in practice. Furthermore, only in this way is it possible to ensure adequate self-locking of the screw means-rivet nut connection.

Within the context of the invention, the spacing A with regard to an individual blind rivet nut 10 may, depending on tolerances arising from the manufacturing process, vary such that there is a greater spacing to the second component from one side of the rivet head than from the opposite side of the rivet head 14. It is also possible that, around the rivet head 14, there are spacings to the second component 2 which arise owing to the rivet head 14 being angular or non-circular. In the context of the invention, it is also the maximum of said spacing that is the relevant dimension. Here, however notches formed for various reasons into the rivet head 14 should be disregarded if the notches are negligible in relation to the overall circumference of the rivet head.

FIG. 4 shows a first design variant of a blind rivet nut according to the invention in cross section. Said blind rivet nut has a rivet head 14 of head height Hk and head width Bk or, in the case of a circular rivet head 14, of head diameter Dk. Said rivet head is adjoined by a thread-free length section of length L1 which extends in the axial direction of the lined rivet nut 10. Said thread-free length section is in turn adjoined by the length section 12 with thread 13 of length Lg, specifically with an internal thread of thread diameter Dig. The outer diameter Da is identical in the thread-free length section 11 and over a major part of the length section with thread 12. Only the end which is at the bottom in the plane of the drawing forms a face side 16 which tapers in conically narrowing fashion in order to facilitate the insertion of the blind rivet nut 10 into the prefabricated opening 8 or the hole of the first component 1. In the arrangement according to the invention as per FIG. 3, the thread-free length section 11 with its length L1 as shown in FIG. 4 would, when the screw means 9 (not shown) is tightened, be compressed so as to form the bead-like protuberance 15, such that said length section 11 is, at the end, significantly shortened to a length L1'. At the tapered end, there is an angle α between the face side 16 of said end and the spatial plane E which is parallel to the rivet head 14.

It is clarified once again at this juncture that, before the use according to the invention, the thread-free length section has a length L1 which, as a result of the use according to the invention, is then compressed, that is to say shortened, as indicated by the reference sign L1' in FIG. 1, but is nevertheless formed correspondingly in FIGS. 2 and 3.

For optimum deformation of the bead-like protuberance, the inner diameter Di of the thread-free length section 11 is greater than the thread diameter Dig. It is also possible for further measures for increasing deformability, for example local heat treatment of said length section or local predetermined deformation points, in particular material weakenings, to be implemented.

FIG. 5 shows a second design variant of a blind rivet nut 10 according to the invention in cross section. By contrast to FIG. 4, the blind rivet nut here has only a very small rivet head 14, which is evident only by way of a chamfer on the outer circumference and which serves for being fully countersunk into the first component 1, such that the surface of the first component 1 terminates flush with the rivet head 14 in the coupling region 6.

Figure 6:
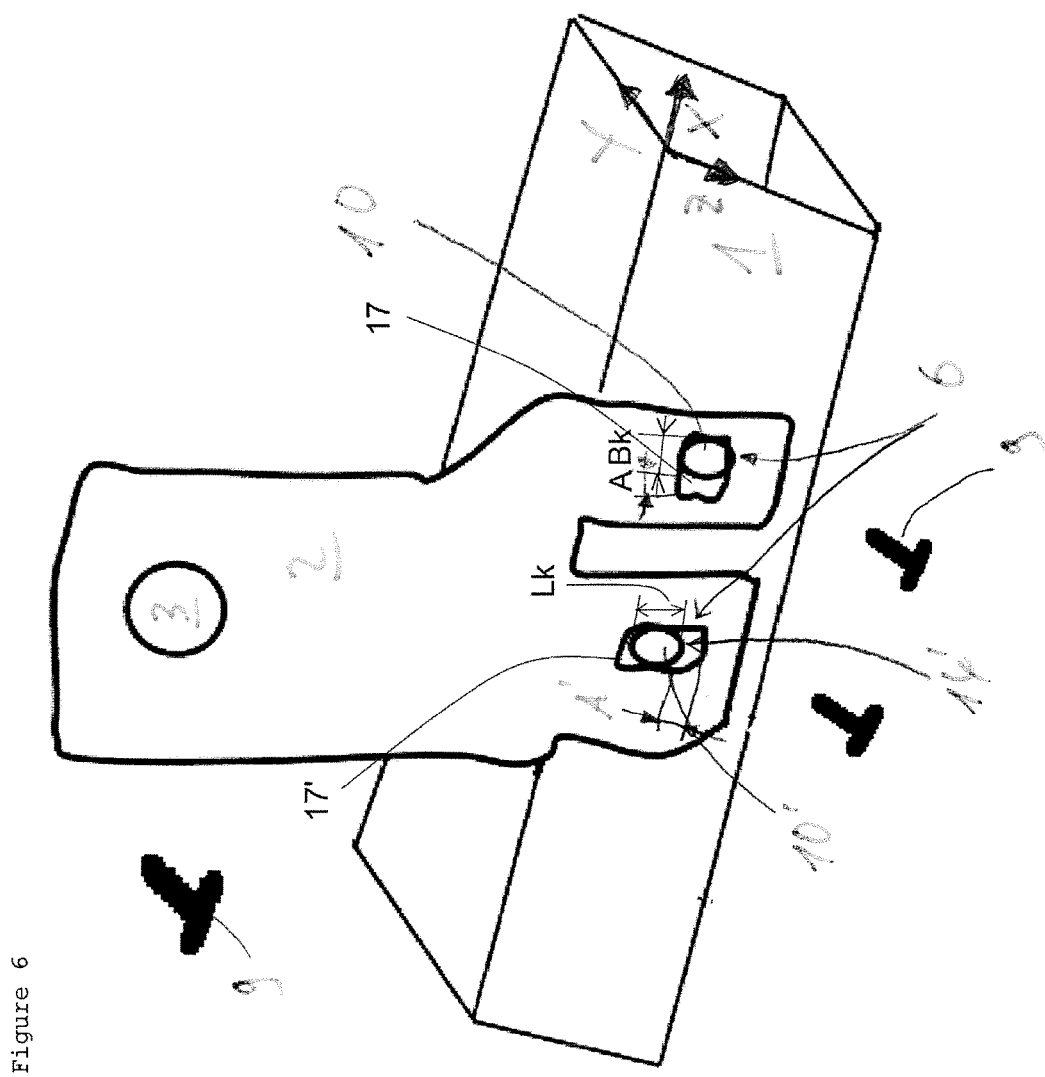
FIG. 6 shows a detail of a component arrangement according to the invention in a perspective view.

Finally, FIG. 6 schematically shows a component arrangement according to the invention. For clarity, the screw means 9 have been illustrated in an exposed position. Nevertheless, it is self-evident that a functional unit which is essential to the invention is formed by the screw means 9 together with the blind rivet nuts 10, which in this case are arranged in a first component 1 in the form of a hollow profile. In the coupling region 6, it is possible to see firstly the blind rivet nuts 10, 10' which have been inserted into the wall of the hollow profile. The second component 2 has slots in the coupling region 6. This gives rise to spacings A, A' between the second component and the rivet heads, wherein the spacings are measured within a plane E which is parallel to the contact surface between the respective rivet head 14 and the first component 1, said plane being indicated by way of example in FIGS. 1 and 2. In this example, the spacings A, A' arise owing to the configuration of the second component 2 with slots. A first spacing A exists along a first spatial axis X axially parallel to the head width direction of one blind rivet nut 10, and the second spacing A' exists along a second spatial axis perpendicular to said spatial axis in the head length direction Z of the other blind rivet nut 10'. This permits tolerance compensation for the fastening of the second component 2 to the first component 1 and also at an attachment point 3 to a third component (not illustrated).

In this component arrangement, too, it can be seen that the spacing A along a first spatial axis X axially parallel to the head width direction of one blind rivet nut 10 exists virtually only on one side, whereas, on the opposite side of said rivet head 10, the spacing is virtually zero. The possible tolerance compensation by way of the slot 17 in the second component has thus been substantially fully exploited. By contrast, the other rivet head 14' has spacings A' on both sides in the head length direction or along the spatial axis Z, wherein said spacings however also differ because the blind rivet nut 10' is arranged offset relative to the center of the slot 17' in the spatial axis Z.

Figure 7:
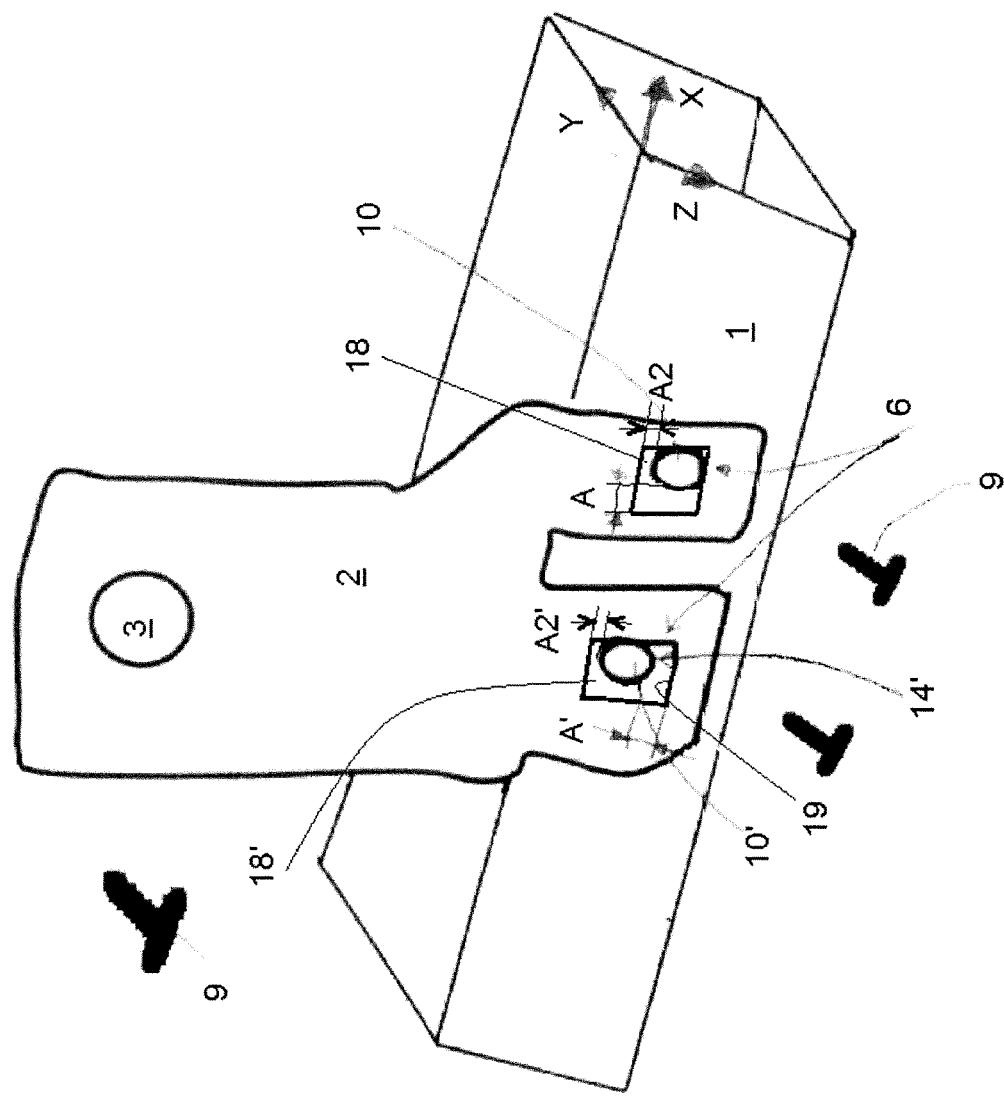
FIG. 7 shows a detail of an alternative component arrangement according to the invention in a perspective view.

By contrast to the component arrangement as per FIG. 6, the second component 2 as per FIG. 7 has, in the coupling region 6, two substantially rectangular holes 18, 18' with a hole edge 19 of considerably larger area than the rivet head. Thus, particularly great installation flexibility between the two components 1, 2 is possible with regard to tolerance compensation in multiple spatial directions. In the left-hand hole 18' in the plane of the figure, it is possible to see spacings A' and A2' which, as viewed from the rivet head in the spatial axis Z, are situated diametrically opposite one another and differ from one another.

In the right-hand hole 18 in the plane of the figure, the rivet head 14 bears on two sides with a spacing of virtually zero against the edge of the hole 18, such that, in each case diametrically opposite, there is a maximum spacing A and A2 respectively. The tolerance compensation reserve has been fully utilized here. In the context of the invention, it is self-evident in the case that, where claim 1 refers to "twice a spacing", the sum of the two different spacings within a spatial axis should be used accordingly.

Each spacing is measured, as is also the case in FIG. 6, from the rivet head 14 radially outward to the edge 19 of the respective hole 17, 17', 18, 18' of the second component 2, specifically within a plane E which is parallel to the contact surface 20 between rivet head 14 and first component 1.

LIST OF REFERENCE NUMBERS

1 First component
2 Second component
3 Attachment point for third component
4 Surface of 1
5 Surface of 3
6 Coupling region
7 Wall of 1
8 Opening
9 Screw means
10, 10' Blind rivet nut
11 Thread-free length section
12 Length section
13 Thread
14, 14' Rivet head
15 Bead-like protuberance
16 Face side of 10
17, 17' Slot of 2
18, 18' Hole of 2
19 Edge
20 Contact surface
A, A' Spacing
A2, A2' Spacing
A3 Protruding length
Da Outer diameter/outer circumference
Di Inner diameter of 11
Dig Inner diameter of 12
Dk Diameter of 14
Dw Diameter/circumference of 15
Lw Bead thickness of 15
L1 Length of 11
L1' Length of 11 in the installed state
Lg Length of 12
Bk Width of 14
Lk Length of 14
Hk Height of 14
H1 Wall thickness of 1
E Plane of 14
R Radius
X Spatial axis
Y Spatial axis
Z Spatial axis
α Angle

What is claimed is:

1. A component arrangement comprising:
   a first component;
   a second component;
   at least one screw; and
   at least one blind rivet nut inserted into a wall of the first component and for coupling, by screw action, to at least one second component, the blind rivet nut having a rivet head,
   wherein, in a cross-sectional view, the sum of a diameter of the rivet head and twice a spacing between an edge of the second component and an edge of the rivet head adjacent to the edge of the second component corresponds to 0.7 to 1.2 times a diameter of a bead-like protuberance of the blind rivet nut, the spacing being within a plane which is parallel to a contact surface between the rivet head and the first component,
   wherein the second component, in the coupling region, is in contact with the first component,
   wherein the spacing between the second component and the rivet head is greater than a wall thickness of the first component, and
   wherein the first component is composed of an aluminum alloy at least in a coupling region to the second component, the at least one screw for the coupling is composed of a material which has a contact-corrosive action on the first component, and the blind rivet nut is composed of an aluminum alloy.

2. The component arrangement as claimed in claim 1, wherein the at least one screw is composed of a steel alloy.

3. The component arrangement as claimed in claim 1, wherein the second component, in the coupling region, is in contact with the first component, the rivet head having at least a width and a length.

4. The component arrangement as claimed in claim 3, wherein the spacing, measured in a direction parallel to a spatial axis X, amounts to at least half of the width or at least half of the diameter of the rivet head, the spatial axis X being parallel to the plane.

5. The component arrangement as claimed in claim 3, wherein the spacing, measured in a direction parallel to a spatial axis Z, corresponds at least to half of the length of the rivet head, the spatial axis Z being perpendicular to the plane.

6. The component arrangement as claimed in claim 3, wherein the sum of the width of the rivet head and twice the spacing between second component and rivet head, measured in a direction parallel to a spatial axis X, corresponds to 0.9 to 1.1 times the bead diameter, or wherein the sum of the diameter of the rivet head and twice the spacing between second component and rivet head, measured in a direction parallel to the spatial axis X, corresponds to 0.8 to 1 times the bead diameter, the spatial axis X being parallel to the plane.

7. The component arrangement as claimed in claim 3, wherein the sum of the width of the rivet head and two mutually different spacings between second component and rivet head, measured in a direction parallel to a spatial axis X, corresponds to 0.9 to 1.1 times the bead diameter, or wherein the sum of the diameter of the rivet head and two mutually different spacings between second component and rivet head, measured in a direction parallel to the spatial axis X, corresponds to 0.7 to 1.2 times, preferably 0.8 to 1 times, the bead diameter, the spatial axis X being parallel to the plane.

8. The component arrangement having two blind rivet nuts and two screws as claimed in claim 1, the second component, in the coupling region to the blind rivet nuts, having in each case one opening for a leadthrough of the screw, wherein the openings permit tolerance compensation in two mutually perpendicular spatial axes within the plane which is parallel to the contact surface between rivet head and first component.

9. The component arrangement as claimed in claim 1, wherein the rivet head terminates substantially flush with the surface of the first component at least in the coupling region.

10. The component arrangement as claimed in claim 1, wherein the rivet head has a head height which corresponds to at most twice the wall thickness and at least ⅓ of the wall thickness of the first component in the coupling region, and by virtue of the fact that the blind rivet nut is pressed only partially into the wall, protrudes beyond the surface of said wall by a protruding length.

11. The component arrangement as claimed in claim 1, wherein the ratio between spacing and wall thickness of the first component in the coupling region satisfies the following condition: $3 > A/H1 > 1$, where A is the spacing and H1 is the wall thickness of the first component.

12. The component arrangement as claimed in claim 1, wherein the blind rivet nut has a circular cross section, comprising a first length section with an outer diameter Da and with an internal thread with a thread diameter Dig, and a thread-free length section with an inner diameter, and comprising a rivet head, wherein the ratio Da/Dig amounts to between 1.3 and 2.5.

13. The component arrangement as claimed in claim 1, wherein the ratio between spacing and wall thickness of the first component in the coupling region satisfies the following condition: $2 > A/H1 > 1.2$, where A is the spacing and H1 is the wall thickness of the first component.

14. The component arrangement as claimed in claim 1, wherein the blind rivet nut has a circular cross section, comprising a first length section with an outer diameter Da and with an internal thread with a thread diameter Dig, and a thread-free length section with an inner diameter, and comprising a rivet head, wherein the ratio Da/Dig amounts to between 1.5 and 2.1.

15. A component arrangement comprising:
a first component;
a second component;
at least one screw; and
at least one blind rivet nut inserted into a wall of the first component and for coupling, by screw action, to at least one second component, the blind rivet nut having a rivet head,
wherein, in a cross-sectional view, the sum of a diameter of the rivet head and twice a spacing between an edge of the second component closest the rivet head and an edge of the rivet head closest to the edge of the second component corresponds to 0.7 to 1.2 times a diameter of a bead-like protuberance of the blind rivet nut, the spacing being within a plane which is parallel to a contact surface between the rivet head and the first component,
wherein the second component, in the coupling region, is in contact with the first component,
wherein the spacing between the second component and the rivet head is greater than a wall thickness of the first component,
wherein the second component, in the coupling region, is in contact with the first component, the rivet head having at least a width and a length, wherein the first component is composed of an aluminum alloy at least in a coupling region to the second component, the at least one screw for the coupling is composed of a material which has a contact-corrosive action on the first component, and the blind rivet nut is composed of an aluminum alloy, and
wherein the spacing, measured in a direction parallel to a spatial axis X, corresponds at least to half of the width of the rivet head, and measured in the direction parallel to a spatial axis Z corresponds at least to half of the length of the rivet head, the spatial axis Z being perpendicular to the spatial axis X, the spatial axis X being parallel to the plane.

* * * * *